US012377368B2

(12) United States Patent
Shukla

(10) Patent No.: US 12,377,368 B2
(45) Date of Patent: Aug. 5, 2025

(54) VALVE SETUP FOR CHROMATOGRAPHY AND FLUID MANAGEMENT SYSTEMS

(71) Applicant: SARTORIUS STEDIM CHROMATOGRAPHY SYSTEMS LTD., Royston (GB)

(72) Inventor: Dinesh Shukla, Bolton, MA (US)

(73) Assignee: Sartorius Stedim Chromatography Systems Ltd., Hertfordshire (GB)

( * ) Notice: Subject to any disclaimer, the term of this patent is extended or adjusted under 35 U.S.C. 154(b) by 827 days.

(21) Appl. No.: 17/476,463

(22) Filed: Sep. 15, 2021

(65) Prior Publication Data

US 2023/0078364 A1    Mar. 16, 2023

(51) Int. Cl.
*B01D 15/10* (2006.01)
*F16K 15/14* (2006.01)
*F16K 27/02* (2006.01)

(52) U.S. Cl.
CPC ............ *B01D 15/10* (2013.01); *F16K 15/144* (2013.01); *F16K 27/0209* (2013.01)

(58) Field of Classification Search
CPC ....... B01D 15/10; B01D 15/18; F16K 15/144; F16K 15/14; F16K 27/0209; F16K 27/02; F16K 7/00; H05K 999/99; G01N 30/38; G01N 30/46; G01N 30/32; G01N 2030/328
USPC ....................................................... 210/218
See application file for complete search history.

(56) References Cited

U.S. PATENT DOCUMENTS

| | | | | |
|---|---|---|---|---|
| 2008/0053543 | A1* | 3/2008 | Baier | G01N 30/20 137/625.25 |
| 2008/0053917 | A1* | 3/2008 | Larson | F16K 99/0001 210/741 |
| 2011/0108485 | A1* | 5/2011 | Bisschops | G01N 30/466 210/659 |
| 2018/0078937 | A1* | 3/2018 | Rensch | B01L 3/502715 |
| 2020/0238282 | A1* | 7/2020 | Burns | B01L 3/502715 |

FOREIGN PATENT DOCUMENTS

WO     WO-2010021815 A1 *  2/2010  .......... F16J 15/3236

* cited by examiner

*Primary Examiner* — Akash K Varma
(74) *Attorney, Agent, or Firm* — Quinn IP Law

(57) ABSTRACT

An assembly is provided that comprises
at least one valve unit (20, 30) comprising a plurality of valves (25), the at least one valve unit (20, 30) having a plurality of valve unit protrusions (32) extending in a first direction and at least one valve unit fastener-engaging component (36);
a valve control block (10) configured to open and close the plurality of valves (25), the valve control block (10) comprising a plurality of pins (15) extending in the first direction (A); and
at least one thrust plate (40) comprising a plurality of thrust plate protrusions (42), a plurality of thrust plate apertures (44) configured to receive the plurality of pins (15) and at least one thrust plate fastener-engaging component (46).

9 Claims, 11 Drawing Sheets

VALVE SETUP FOR CHROMATOGRAPHY AND FLUID MANAGEMENT SYSTEMS

BACKGROUND

Biopharmaceutical or pharmaceutical production involves the purification of solutions from which active pharmaceutical ingredients (API) are extracted. These solutions, also known as feeds, can be produced chemically-synthetically or biologically-organically. The feed comprises a plurality of components that need to be separated from each other, e.g. one or more target components and impurities. Chromatography is a technique used to perform this separation process.

One implementation of chromatography for separating two components is the simulated moving bed (SMB). An SMB system comprises a plurality of columns connected in series, two inlets (one for the feed and one for the buffer) and two outlets (one for each component of the feed). The position of the inlets and the outlets is moved at regular intervals in a given direction to simulate a movement of the columns in the opposite direction. The switching of the position of the inlets and outlets requires a set of valves suitably controlled.

The BioSMB systems by Sartorius® for SMB chromatography include a valve setup comprising two separate blocks: a valve control block that regulates the switching of the valves and a valve cassette block that comprises the plurality of valves. The valve cassette block is the only component that comes in contact with the fluids, and can be conveniently replaced after every use in order to avoid a cumbersome cleaning process.

The connection between the valve control block and the valve cassette block needs to be airtight. Conventionally, the valve cassette block is pressed against the control block using a plurality of screws and washers tightened in a predetermined sequence, e.g. first at 2 Nm and then at 3.5 Nm. This procedure requires a calibrated torque wrench and a long installation time (about 45 minutes).

Another conventional method for securing the valve cassette block to the control block is the use of a swivel door with an array of hydraulic cylinders, which apply the required sealing pressure. This procedure involves a very complex design and high costs.

SUMMARY

According to one aspect, a valve setup or assembly is provided. The assembly comprises:
  at least one valve unit comprising a plurality of valves, the at least one valve unit having a plurality of valve unit protrusions (in the following also called first protrusions) extending in a first direction and at least one valve unit fastener-engaging component (in the following also called a first fastener-engaging component);
  a valve control block configured to open and close the plurality of valves, the valve control block comprising a plurality of pins extending in the first direction; and
  at least one thrust plate comprising a plurality of thrust plate protrusions (in the following also called second protrusions), a plurality of thrust plate apertures (in the following also called second apertures) configured to receive the plurality of pins and at least one thrust plate fastener-engaging component (in the following also called second fastener-engaging component);
  wherein:
    the at least one valve unit further comprises a plurality of fitted through-holes configured to receive the plurality of pins and the at least one valve unit is positioned adjacent to the valve control block in the first direction;
    the at least one thrust plate is positioned adjacent to the at least one valve unit in the first direction such that the plurality of thrust plate protrusions (i.e. second protrusions) face the plurality of valve unit protrusions (i.e. first protrusions);
    the at least one valve unit fastener-engaging component (i.e. first fastener-engaging component) and the at least one thrust plate fastener-engaging component (i.e. second fastener-engaging component) are configured to be separated by an engagement distance along a second direction perpendicular to the first direction and are configured to be engaged by a fastener to reduce the engagement distance such that the at least one thrust plate and the at least one valve unit at least partially move relative to each other along the second direction;
    the plurality of pins and the plurality of thrust plate apertures are configured such that the position of the at least one thrust plate with respect to the first direction is fixed relative to the plurality of pins; and
    the valve unit protrusions and the thrust plate protrusions are configured such that the relative motion along the second direction is translated into a force on the at least one valve unit in a direction opposite the first direction.

In one example, the at least one valve unit may comprise:
  at least one valve cassette block comprising the plurality of valves and the plurality of fitted through-holes; and
  at least one counterplate comprising the plurality of valve unit protrusions, a plurality of counterplate apertures configured to receive the plurality of pins, and the at least one valve unit fastener-engaging component;
  wherein the at least one counterplate is positioned adjacent to the at least one valve cassette block in the first direction (A).

In some examples, the valve unit, more specifically the valve cassette block is made and employed as single-use component, while the other component, i.e. specifically the valve control block and the thrust plate, more specifically also the counterplate are made and employed as multi-use or reusable components.

According to another aspect, a method for assembling a valve setup or assembly is provided. The method comprises:
  providing at least one valve unit comprising a plurality of valves, the at least one valve unit having a plurality of valve unit protrusions (in the following also called first protrusions) extending in a first direction and at least one valve unit fastener-engaging component (in the following also called first fastener-engaging component);
  providing a valve control block configured to open and close the plurality of valves, the valve control block comprising a plurality of pins extending in the first direction; and
  providing at least one thrust plate comprising a plurality of thrust plate protrusions (in the following also called second protrusions), a plurality of thrust plate apertures (in the following also called second apertures) configured to receive the plurality of pins and a at least one thrust plate fastener-engaging component (in the following also called second fastener-engaging component);
  wherein the at least one valve unit further comprises a plurality of fitted through-holes configured to receive the plurality of pins;

the method further comprising:
positioning the at least one valve unit adjacent to the valve control block in the first direction by inserting the plurality of pins in the fitted through-holes;
positioning the at least one thrust plate adjacent to the at least one valve unit in the first direction by inserting the plurality of pins in the plurality of thrust plate apertures (i.e. second apertures), such that the plurality of thrust plate protrusions (i.e. second protrusions) face the plurality of valve unit protrusions (i.e. first protrusions); and
engaging with a fastener the at least one valve unit fastener-engaging component (i.e. first fastener-engaging component) and at least one the thrust plate fastener-engaging component (i.e. second fastener-engaging component) to cause the at least one thrust plate and the at least one valve unit to at least partially move relative to each other along a second direction perpendicular to the first direction;
wherein:
the plurality of pins and the plurality of thrust plate apertures (i.e. second apertures) are configured such that the position of the at least one thrust plate with respect to the first direction is fixed relative to the plurality of pins; and
the valve unit protrusions (i.e. first protrusions) and the thrust plate protrusions (i.e. second protrusions) are configured such that the relative motion along the second direction is translated into a force on the at least one valve unit in a direction opposite the first direction.

In one example, providing the at least one valve unit may comprise:
providing at least one valve cassette block comprising the plurality of valves and the plurality of fitted through-holes;
providing at least one counterplate comprising the plurality of valve unit protrusions, a plurality of counterplate apertures configured to receive the plurality of pins, and the at least one valve unit fastener-engaging component; and
positioning the at least one counterplate adjacent to the at least one valve cassette block in the first direction.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

Figure 1:
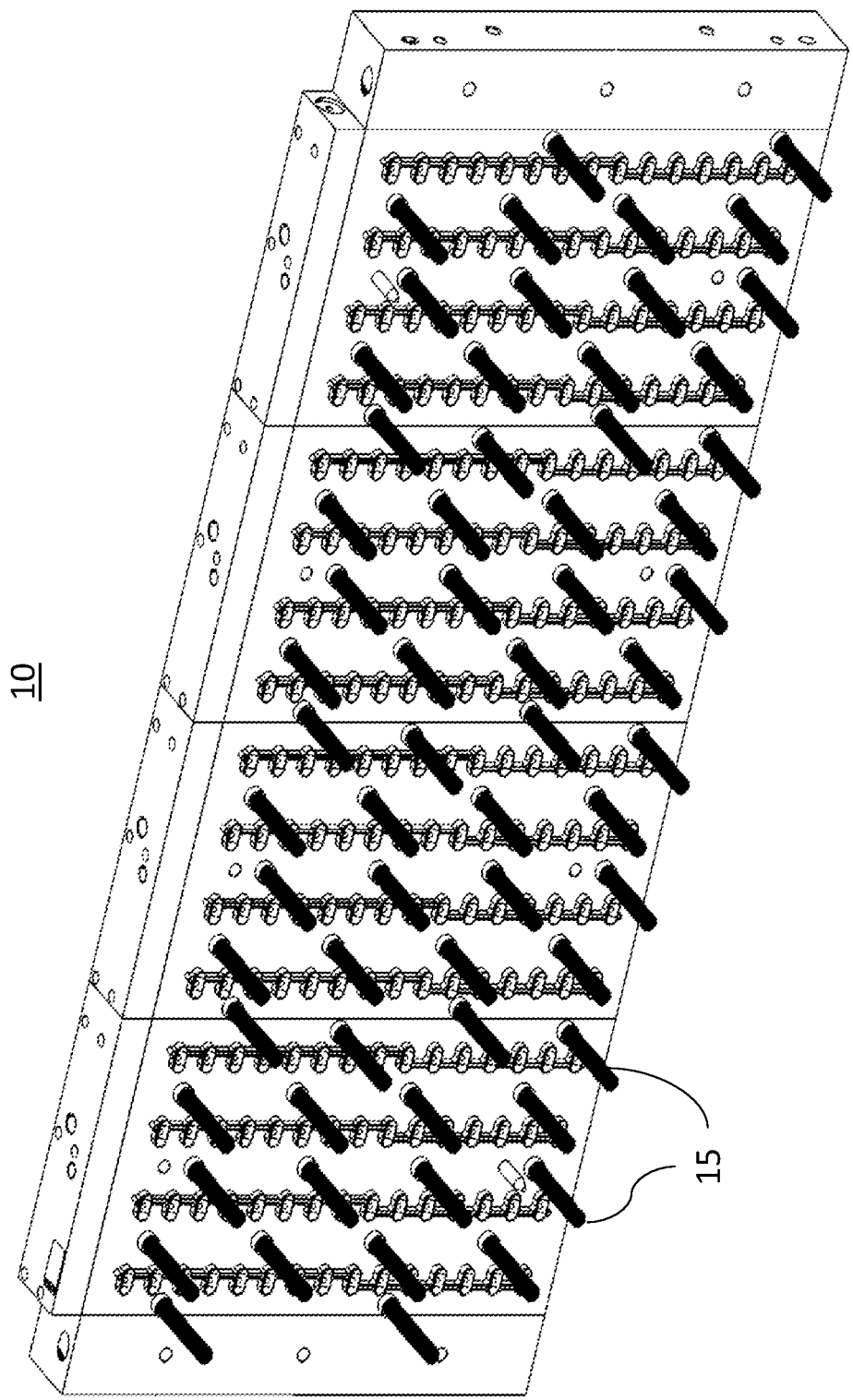
FIG. 1 shows an example of a valve control block.

In the following, a detailed description of examples will be given with reference to the drawings. It should be understood that various modifications to the examples may be made. Unless explicitly indicated otherwise, elements of one example may be combined and used in other examples to form new examples.

The following description relates to an assembly that constitutes a valve setup for use e.g. in a SMB chromatographic separation process. The chromatographic separation process may be performed exemplarily to purify recombinant protein products, or monoclonal antibodies, or viral vectors, or DNA products.

It should be understood that the herein described valve setup and its use is not restricted to a SMB chromatographic separation process. In fact, a skilled person in the field will acknowledge that the herein described valve setup can be used in any kind of fluid management system in which multiple valves are required to direct fluid flow of a liquid. The valve setup according to the present invention may for example be used in tangential flow filtration (TFF) processes or virus inactivation & product conditioning, Filtration (Depth, Sterile and Virus) and 2 Column Chromatography (Flow Through and Bind & Elute) steps. In a further example the valve setup can be used to combine more than one unit operation on a single system including but not limited to a multi-column chromatography (MCC) process and a virus inactivation step.

The assembly comprises two main components, at least one valve cassette block comprising a plurality of valves and a valve control block that controls the plurality of valves. Each block is a three-dimensional object having at least a pair of substantially flat surfaces parallel to each other. Exemplarily, a block may approximately have a cuboid shape.

In case the valve setup is used to combine more than one unit operation on a single system, this may be achieved by using one single valve cassette block comprising a plurality of valves which direct the fluid path of the more than one unit operation. In an alternative embodiment, the number of valve cassette blocks may correspond to the number of unit operations to be combined on the single system. The use of more than one valve cassette block for the more than one unit operations has the benefit that the more than one valve cassette blocks can be specifically designed and adapted to meet the requirements of a given unit operation.

More specifically, in one example a system or assembly may comprise one valve control block in combination with a plurality of valve cassette blocks, which can be separately attached to the valve control block and which may be adapted to specific requirements of the system. In such an arrangement it is further advantageous that at least a plurality of thrust plates are provided each corresponding to one of the plurality of valve cassette blocks.

The valve cassette blocks may for example differ with respect to the diameter of the fluid paths, allowing for different fluid velocity and flow pressure, or in their fluid path arrangement. Furthermore, the more than one valve cassette blocks may have different inlets and outlets to provide different fluids (e.g. buffers) to a given unit operation. An example would be a valve cassette block designed for applications in tangential flow filtration (TFF) processes, virus inactivation & product conditioning, Filtration (Depth, Sterile and Virus) and 2 Column Chromatography (Flow Through and Bind & Elute).

The following description and explanations generally refer to a valve setup comprising one valve cassette block. The restriction to a single valve cassette block is for mere illustrative purposes. Rather it should be understood that the general teaching is not restricted to the use of a single valve cassette block but equally applies to the use of more than one valve cassette block in the herein described valve setup.

Figure 2:
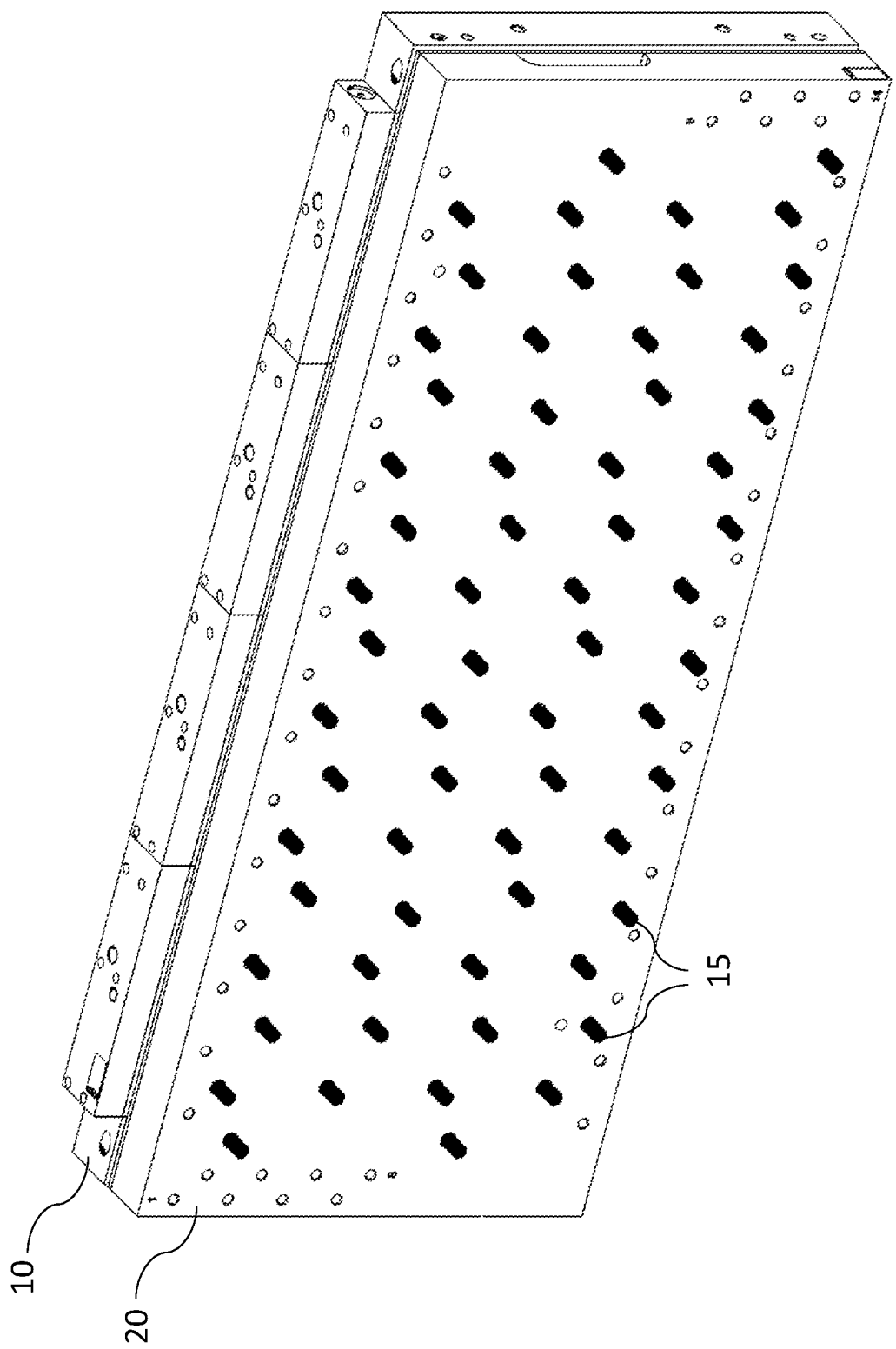
FIG. 2 shows an example of an assembly comprising a valve control block and a valve cassette block.

FIG. 1 shows an example of a valve control block 10 and FIG. 2 shows an example of an assembly comprising a valve cassette block 20 and the valve control block 10.

The valve cassette block 20 comprises a plurality of valves 25 (not shown in FIG. 2), e.g. membrane or diaphragm valves. The valve control block 10 comprises control elements for controlling the valves 25 in the valve cassette block 20, for example a plurality of solenoids, wherein each solenoid is configured to open/close a respective valve 25. Accordingly, the valve cassette block 20 may comprise n valves and the valve control block 10 may comprise n control elements, e.g. including solenoids.

The plurality of valves 25 may be located on one of the substantially flat surfaces of the valve cassette block 20. Similarly, the control elements may be located on one of the substantially flat surfaces of the valve control block 10. The arrangement of the valves 25 on the valve cassette block 20 may conform to the arrangement of the control elements on the valve control block 10 so that it is possible to bring each valve in correspondence of its respective control element when placing the valve cassette block 20 next to the valve control block 10.

Figure 3A:
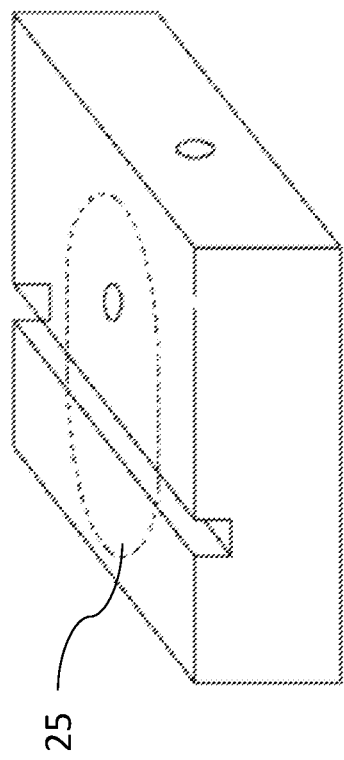
FIG. 3a shows a portion of an exemplary valve cassette block comprising a valve and channels.

The valve cassette block 20 comprises a plurality of channels that may be connected or disconnected by actuating the valves 25. FIG. 3a shows a cut-out portion of the valve cassette block 20 comprising a membrane valve 25 and two channels in orthogonal directions to each other. The structure of the valve cassette block 20 may comprise a plurality of portions such as the one shown in FIG. 3a, in order to provide a manifold of valves 25 and interconnectable conduits that form a flow path. The valve cassette block 20 may comprise inlet and outlet connectors for connecting to external components, e.g. chromatography columns or membrane devices or collection vessels. Exemplarily, the valve cassette block 20 may be a unitarily formed block, made of e.g. plastic such as acrylic resin.

Figure 3B:
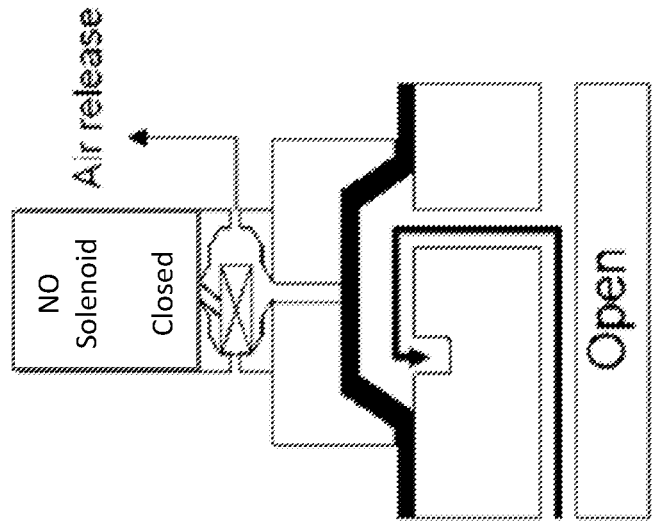
FIG. 3b shows a functioning of an exemplary valve.
Figure 3B:
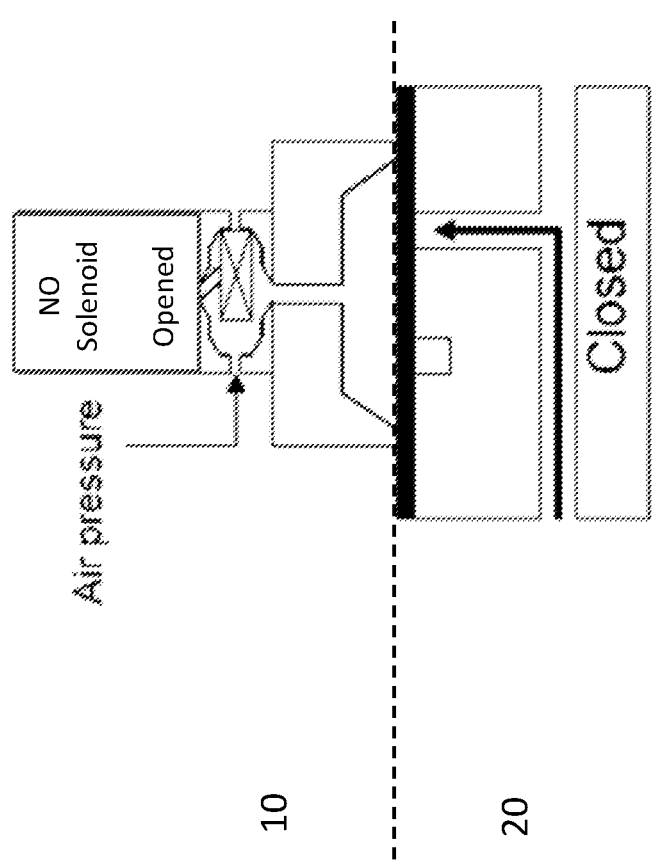

FIG. 3b shows a functioning of an exemplary membrane valve 25 in the valve cassette block 20 controlled by a corresponding solenoid in the valve control block 10. In particular, the valve control block 10 may further comprise a plurality of air chambers, each associated to a corresponding solenoid, so that the solenoid acts as pneumatic actuator for the corresponding valve 25. An air chamber may comprise one or more cavities, e.g. one cavity on the surface of the valve control block 10 configured to receive the membrane valve. The air chamber may further comprise a cavity with an inlet and an outlet for air passage.

For example, the solenoid may be a normally open (NO) solenoid, which implies that the membrane valve is normally closed (left-hand side of FIG. 3b). When the solenoid switches from open to closed, it removes the air pressure on the membrane valve, which then opens, connecting the conduits in the valve cassette block 20 (right-hand side of FIG. 3b).

In other examples, any of electromechanical actuators/pinch valves, air actuated plungers, flex membranes and/or shape memory alloy actuators may be used.

The valve control block 10 and the valve cassette block 20 cooperate to switch flow paths and, thus, connections to inlets for feed and solvent as well as outlets. The valve control block 10 and valve cassette block 20 are formed separately and subsequently mechanically joined. One advantage of this configuration is that the valve control block 10 may be a permanent component of the chromatography system and the valve cassette block 20 may be a single-use component which can be adopted for different unit operations.

The dashed line on the left-hand side of FIG. 3b shows the interface between the valve control block 10 and the valve cassette block 20. In order to ensure a correct functioning of the valve setup, the valve control block 10 and the valve cassette block 20 must be in airtight contact with each other and the valves 25 of the valve cassette block 20 must be accurately positioned in correspondence of the control elements (e.g. solenoids and air chambers) in the valve control block 10.

The valve control block 10 comprises a plurality of pins 15 extending in a first direction from the valve control block 10, as shown in FIG. 1. In this description, the expression "along a direction" is used to indicate that something extends or moves parallel to the direction, either in the orientation of the direction (positive direction) or in the opposite orientation (negative direction). The expression "in a direction" is used to indicate that something follows the specific orientation of the direction, i.e. the positive direction. For instance, if the direction coincides with the x axis of a Cartesian coordinate system, "along the direction" means parallel to the x axis while "in the direction" means following the increasing x coordinates.

The first direction may be perpendicular to the substantially flat surface on which the control elements are located. The valve control block 10, including the plurality of pins 15, may exemplarily be made of metal. The pins 15 may be formed unitarily with the rest of the valve control block 10 or may be affixed to it, e.g. by means of screws. All pins 15 may be identical to each other. The shape, arrangement and total number of pins may depend on the specific design required for a certain unit operation.

A pin 15 may be an elongated piece, i.e. a three-dimensional object in which the length is greater than the other two dimensions. Exemplarily, the pin may have a substantially tubular or cylindrical shape. The diameter of the cross section of the pin or, in case of a different shape, the characteristic dimensions for the cross section (e.g. width and height) may be between about 7 mm and about 9 mm. The pins 15 may be uniformly distributed on the surface of the valve control block 10.

Each pin 15 may comprise a positioning feature, such as a groove or a bulge, configured to interact with a complementary feature in another element, in particular the thrust plate, as discussed below.

The valve cassette block 20 further comprises a plurality of fitted through-holes configured to receive the plurality of pins 15. In particular, the number of fitted through-holes may be the same as the number of pins 15. By inserting each pin 15 in its corresponding through-hole, the valve cassette block 20 is interlocked with the valve control block 10. The through-holes are substantially fitted for the pins, meaning that the shape and dimensions of the through-holes substantially match the shape and dimensions of the cross section of the pins. The cross section in question is the one perpendicular to the first direction.

Accordingly, the valve cassette block 20 is positioned adjacent to the valve control block 10 along the first direction. In particular, in the assembled configuration of FIG. 2, the substantially flat surface of the valve cassette block 20 on which the valves 25 are placed faces the substantially flat surface of the valve control block 10 on which the control elements are placed. Exemplarily, the two surfaces may be substantially coextensive.

The interplay between the fitted through-holes and the pins 25 allows for a precise positioning of the valve cassette block 20 with respect to the valve control block 10. In particular, the valves 25 are positioned in correspondence of the control elements.

The exemplary combination of valve control block 10 and valve cassette block 20 shown in FIG. 2 may be connected to up to sixteen chromatographic columns, TFF membrane devices or other unit operations that require multiple valves for directing fluid flow. For instance, the valve cassette block 20 may comprise 240 valves and the valve control block 10 may comprise 64 pins. These numbers may vary in alternative examples. Depending on the design, the width of the valve cassette block and the valve control block may exemplarily be as low as about 152 mm and as high as about 700 mm.

In order to press the valve cassette block 20 against the valve control block 10 with a force sufficient to create an airtight contact, the assembly further comprises at least one counterplate 30 and at least one thrust plate 40. In particular, the assembly comprises an equal number of counterplate(s) 30 and thrust plate(s) 40, i.e. pair(s) thereof. In other words, the assembly comprises at least one pair of plates comprising a counterplate 30 and a thrust plate 40. In the following, the term "plate" may be used to refer both to the counterplate 30 and the thrust plate 40.

Each plate is a substantially flat sheet, i.e. characterized by two substantially parallel flat surfaces (e.g. having a substantially rectangular shape) separated by a thickness e.g. between about 1.5 mm and 3.0 mm. Each plate may exemplarily be made of metal or other rigid material.

The dimensions of the counterplate 30 may be substantially the same as the dimensions of the thrust plate 40. In particular, the height of the plates may be less than the height of the valve cassette block 20 and the (cumulative) width of the one or more plates in the assembly may be less than the width of the valve cassette block 20. Depending on the design, the width of a plate may exemplarily be between about 150 mm and about 152 mm and the length of a plate may exemplarily be between about 232 mm and about 240 mm.

Figure 4:
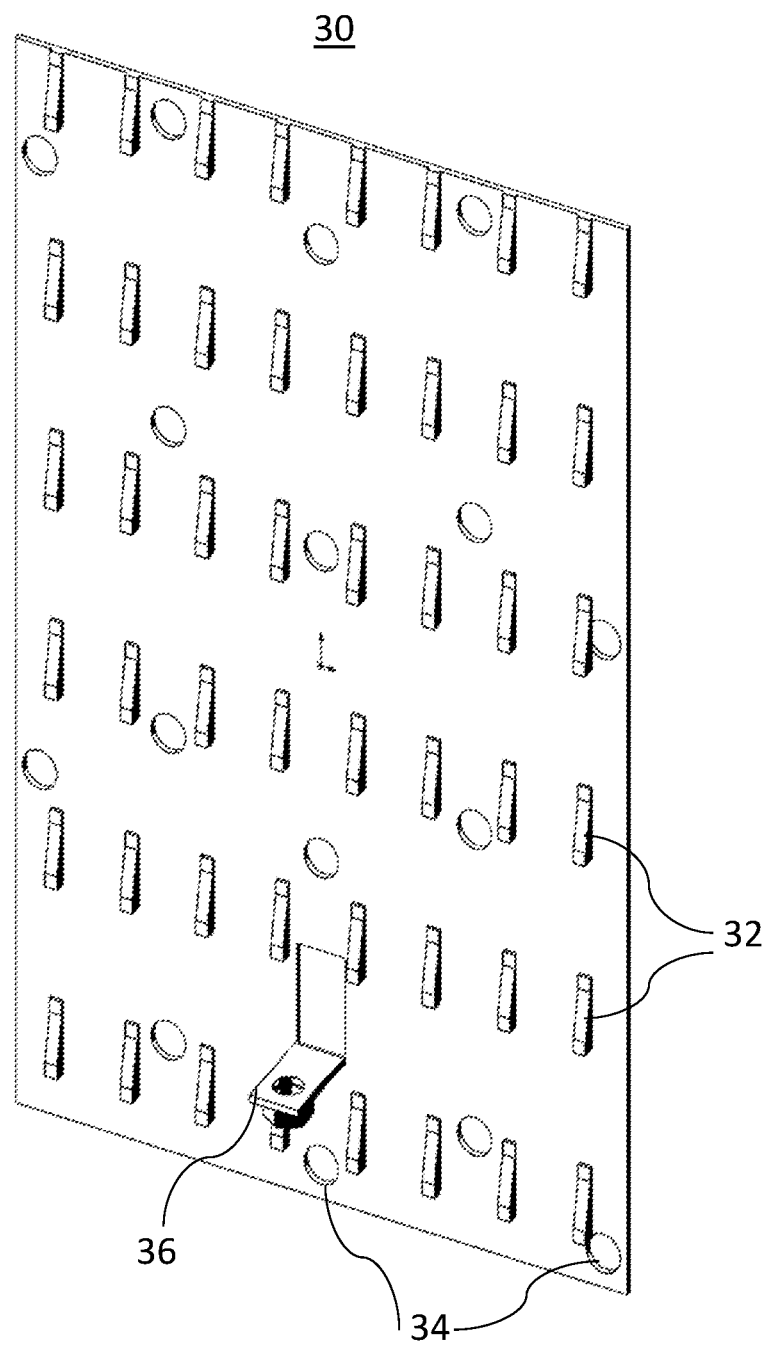
FIG. 4 shows a front view of an exemplary counterplate.

FIG. 4 shows a front view of an exemplary counterplate 30. The counterplate 30 comprises a plurality of first protrusions 32, a plurality of first apertures 34 and a first fastener-engaging component 36. The plurality of first apertures 34 is configured to receive the plurality of pins 15, i.e. each first aperture 34 can let a respective pin 15 through the counterplate 30. The first apertures 34 may all be identical to each other. The first protrusions 32 as well as the first fastener-engaging component 36 are provided only on one side (or flat surface) of the counterplate 30. In particular, the first fastener-engaging component 36 may be provided on the same side of the first protrusions 32.

The at least one counterplate 30 is positioned adjacent to the valve cassette block 20 in the first direction by inserting the pins 15 in the first apertures 34. In particular, the flat surfaces of the counterplate 30 may be substantially perpendicular to the first direction. The counterplate 30 is positioned so that the side without the first protrusions 32 is facing the valve cassette block 20. In other words, the first protrusions 32 extend in the first direction from the surface of the counterplate 30.

The first protrusions 32 may all be identical to each other. The first protrusions 32 may be uniformly distributed on the surface of the counterplate 30. In other words, the density of first protrusions 32 (as number of protrusions per unit of surface) may be substantially constant.

Figure 5:
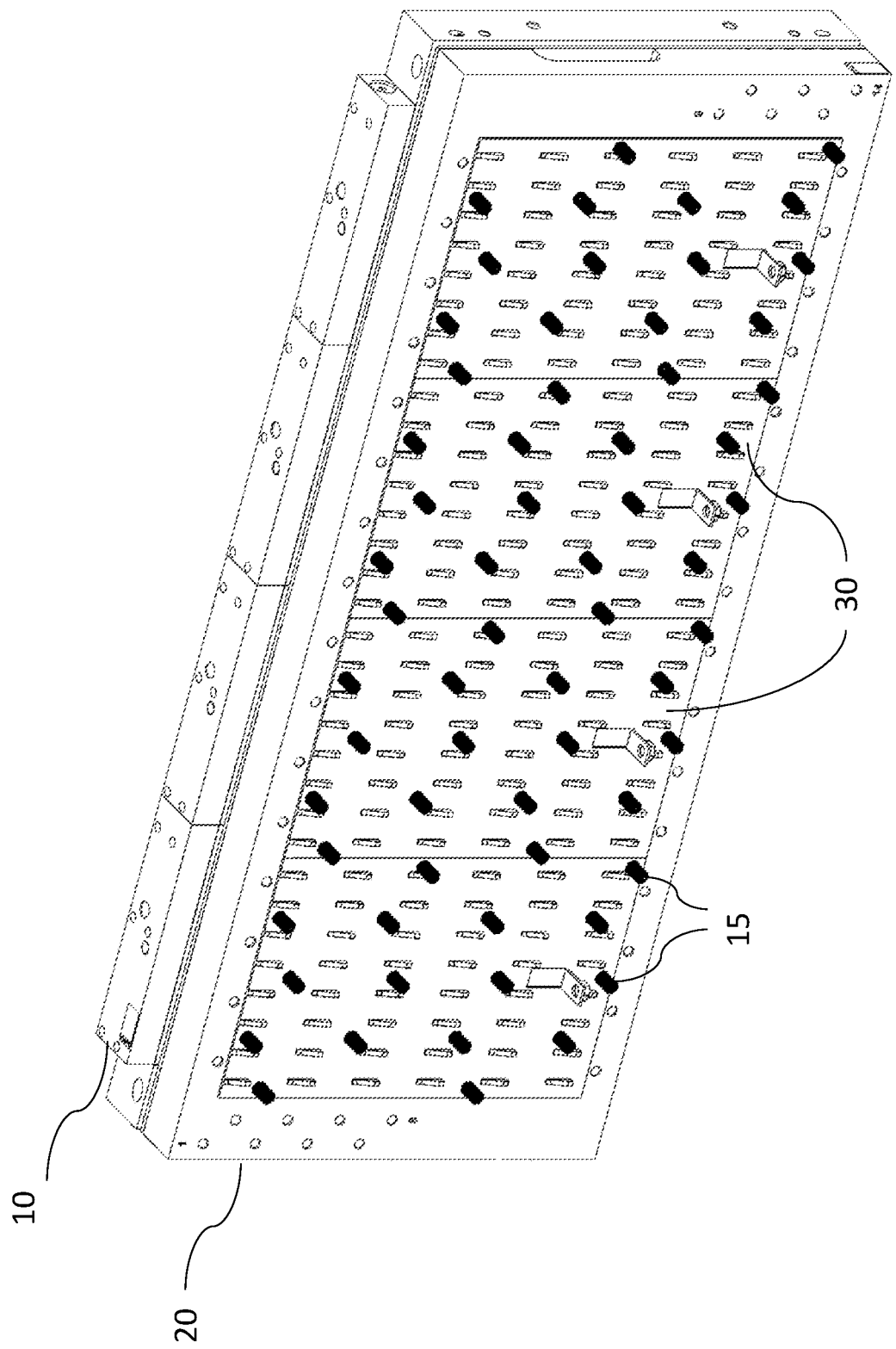
FIG. 5 shows an example of an assembly comprising counterplates, a valve cassette block and a valve control block.

FIG. 5 shows an example of an assembly comprising counterplates, a valve cassette block and a valve control block. In this example, four identical counterplates are arranged next to each other across the width of the valve cassette block 20, however this number may be different in other implementations. The number of pairs of plates may be determined based on considerations about e.g. application, stability and stress resistance of the assembly. The counterplates 30 are identical to one another.

In cases in which the assembly comprises a plurality of counterplates 30, each of the counterplates 30 is placed adjacent to the valve cassette block 20 in the first direction. The counterplates 30 may be located next to each other on the surface of the valve cassette block 20. In some examples, they may be in contact with each other so as to provide a substantially continuous cover to the surface. In other examples, there may be separation between the counterplates 30.

Figure 6:
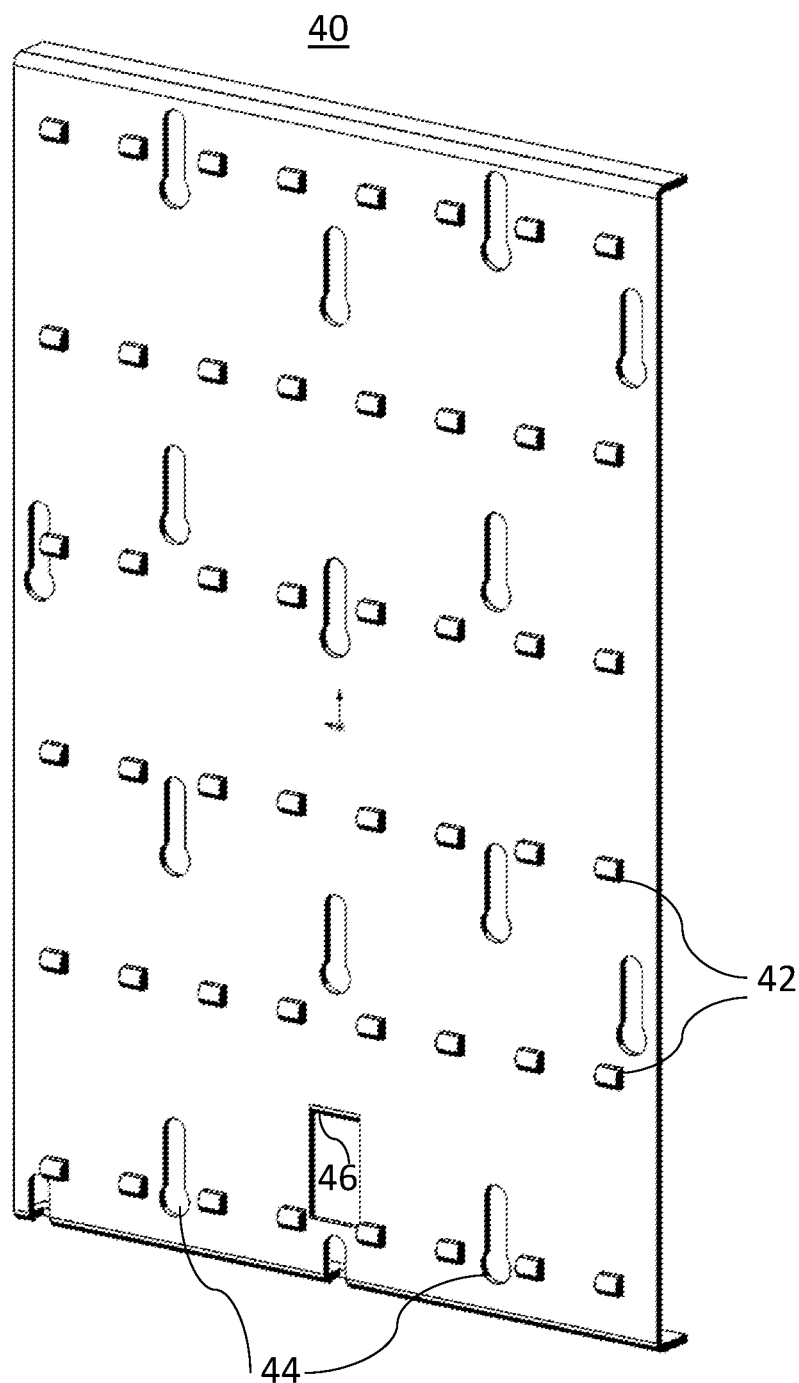
FIG. 6 shows a rear view of an exemplary thrust plate.

FIG. 6 shows a rear view of an exemplary thrust plate 40. The thrust plate 40 comprises a plurality of second protrusions 42, a plurality of second apertures 44 and a second fastener-engaging component 46. The plurality of second apertures 44 is configured to receive the plurality of pins 15, i.e. each second aperture 44 can let a respective pin 15 through the thrust plate 40. The second apertures 44 may all be identical to each other. The second protrusions 42 are provided only on one side (or flat surface) of the thrust plate 40 and the second fastener-engaging component 46 may be provided on the opposite side.

The at least one thrust plate 40 is positioned adjacent to the at least one counterplate 30 in the first direction by inserting the pins 15 in the second apertures 44. In particular, the flat surfaces of the thrust plate 40 may be substantially perpendicular to the first direction. The thrust plate 40 is positioned so that the side with the second protrusions 42 is facing the counterplate 30. In other words, the second protrusions 42 extend in the direction opposite the first direction. Thus, the plurality of second protrusions 42 face the plurality of first protrusions 32.

The second protrusions 42 may all be identical to each other. The second protrusions 42 may be uniformly distributed on the surface of the thrust plate 40. In other words, the density of second protrusions 42 (as number of protrusions per unit of surface) may be substantially constant.

Exemplarily, the number of first protrusions 32 may be equal to the number of second protrusions 42. The spatial arrangement of the first protrusions 32 on the counterplate 30 and the spatial arrangement of the second protrusions 42 on the thrust plate 40 may correspond to each other, so that the first protrusions 32 and the second protrusions 42 may abut against each other in at least some configurations of the assembly, as explained below.

Figure 7:
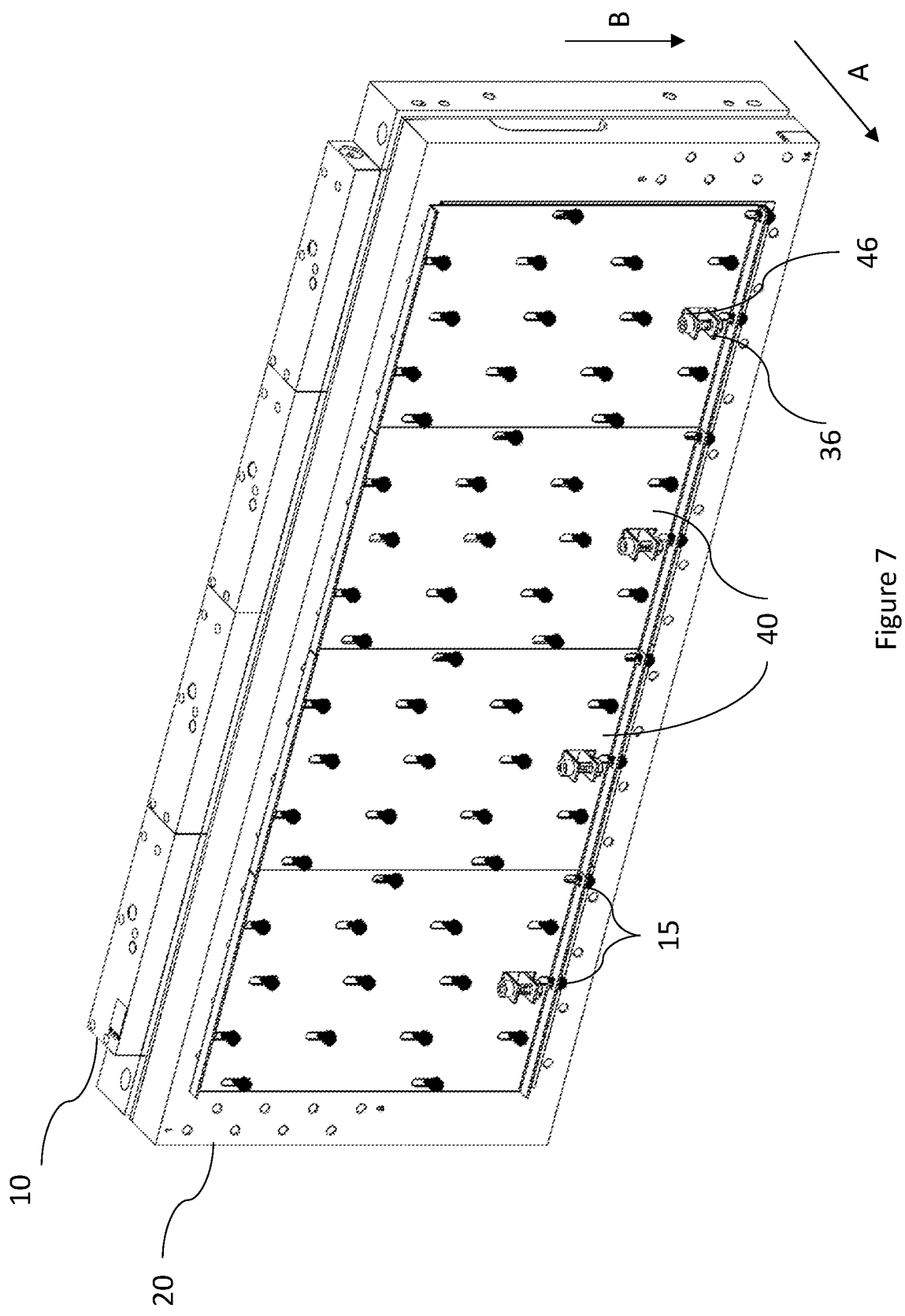
FIG. 7 shows a front view of an exemplary assembly comprising thrust plates, counterplates, a valve cassette block and a valve control block in a first configuration.

FIG. 7 shows an example of an assembly comprising thrust plates 40, counterplates 30, a valve cassette block 20 and a valve control block 10. The length of the pins 15 is greater than the sum of the thicknesses of the valve cassette block 20, the counterplate 30 and the thrust plate 40. In other words, the pins 15 protrude out of the assembly. Exemplarily, the length of each pin 15 may be between about 4.6 cm and about 4.8 cm.

The thrust plates 40 are identical to one another. Accordingly, if reference is made to a single pair counterplate 30 plus thrust plate 40, it is clear that the same applies to all pairs (in case of a plurality of pairs), since all pairs are identical.

The configuration of FIG. 7 (referred to as "first configuration" hereinafter) is obtained by joining the valve control block 10, the valve cassette block 20, the counterplates 30 and the thrust plates 40 solely by means of the pins 15. The valve cassette block 20 is thrusted against the valve control block 10, the counterplates 30 are thrusted against the valve cassette block 20 and the thrust plates 40 are thrusted against the counterplates 30.

The positioning of the valve cassette block 20, the counterplate 30 and the thrust plate 40 in respective planes perpendicular to the first direction A is determined by the positions of the through-holes, the first apertures 34 and the second apertures 44, respectively. As already mentioned, the location of the through-holes on the valve cassette block 20 is such that each valve 25 faces its corresponding control element. Further, the through-holes are fitted, so that the valve cassette block 20 cannot shift in a direction perpendicular to the first direction A. In other words, the alignment between the valves 25 and the control elements cannot be disarranged.

In the first configuration the first fastener-engaging component 36 and the second fastener-engaging component 46 are separated by a first distance in a second direction B perpendicular to the first direction A. In other words, the first fastener-engaging component 36 and the second fastener-engaging component 46 may be configured to be at a first distance along the second direction before being engaged by the fastener.

The second direction B is shown as the downward direction in FIG. 7, however this is just an example. Considering a Cartesian coordinate system in which the first direction coincides with the x direction, the second direction may be any direction in the y— z plane. In particular, the second direction may be the y direction or the z direction.

Said otherwise, the position of the first fastener-engaging component 36 on the counterplate 30 and the position of the second fastener-engaging component 46 on the thrust plate 40, as well as the locations of the first apertures 34 and the second apertures 44, are such that in the first configuration (i.e. by assembling the plates along the pins 15) there is a first distance between the fastener-engaging components 36, 46 in the second direction B.

Exemplarily, each fastener-engaging component 36 or 46 may comprise a member projecting from the respective plate, e.g. in the first direction A, and a hole within the projecting member for receiving a fastener. The projecting member may be substantially flat and perpendicular to the plate. The dimension of the projecting member in the first direction A may be between about 1.8 cm and about 2.2 cm and its dimension in the direction perpendicular to both the first and second directions (referred to hereinafter as "third direction") may be between about 1.1 cm and about 1.3 cm. The hole may be substantially circular with a diameter between about 0.65 cm and about 0.75 cm.

Exemplarily, the thrust plate 40 may comprise a gap (an opening) configured to receive the first fastener-engaging component 36. In other words, the first fastener-engaging component 36 may cross through the thrust plate 40. The gap may be further configured to enable a movement of the first fastener-engaging component 36 within it, e.g. in the second direction. Exemplarily, the counterplate 30 may comprise a gap corresponding to the gap in the thrust plate 40, which may e.g. be created by slicing the first fastener-engaging component 36 out of the counterplate 30 when forming it.

As already discussed, the relative position between the first fastener-engaging component 36 and the second fastener-engaging component 46 in the assembled configuration is of relevance. The absolute position of each fastener-engaging component on its respective plate may be any position. For example, each fastener-engaging component may be positioned along at least one symmetry axis of its plate, e.g. the symmetry axis along the second direction B.

The first fastener-engaging component 36 and the second fastener-engaging component 46 are configured to be engaged by a fastener, e.g. a screw. In particular, the fastener-engaging components 36 and 46 are configured to be engaged by the same fastener, so as to reduce the distance therebetween to a second distance. In particular, the second distance may be substantially zero, thereby bringing the fastener-engaging components 36 and 46 in contact with each other.

The shape and dimensions of the first apertures 34 and of the second apertures 44 are such that a relative motion between the counterplate 30 and its respective thrust plate 40 along the second direction B is possible. In other words, the at least one thrust plate 40 and the at least one counterplate 30 are configured to move relative to each other along the second direction B when a fastener engages the first and second fastener-engaging components 36, 46.

In particular, at least one plurality of apertures between the plurality of first apertures 34 and the plurality of second apertures 44 may comprise elongated apertures. In other words, either the plurality of first apertures 34 or the plurality of second apertures 44 or both may be elongated apertures. An elongated aperture is an aperture that has a dimension along the second direction B (referred to as "aperture length") that is greater than its dimension transverse to the second direction B. Exemplarily, the aperture length may be between about 1.3 cm and about 1.5 cm.

An elongated aperture may be considered as comprising a first end portion and a second end portion, the first end portion being positioned before the second end portion in the second direction B. For example, if the second direction B is the downward direction, the first end portion is above the second end portion. If in the first configuration each pin 15 is accommodated in the first end portion of its respective elongated aperture, in the second configuration (discussed below) each pin 15 is accommodated in the second end portion of its respective elongated aperture, or vice versa.

Exemplarily, the other dimension of an elongated aperture in the third direction (referred to as "aperture width") may be substantially the same as the corresponding dimension of a pin 15 (referred to as "second cross dimension of the pin"). In this way, a movement of a plate in the plane perpendicular to the first direction A may be constrained to be only along the second direction B. The aperture width may vary along the aperture length, as discussed below.

If only one plurality of apertures, i.e. either the first or the second, is a plurality of elongated apertures, the other one may be a plurality of fitted apertures. Fitted apertures have a shape and dimensions that substantially match the shape and dimensions of the cross section of the pins 15. In the examples shown in FIGS. 4 and 6, the plurality of first apertures 34 are fitted apertures and the plurality of second apertures 44 are elongated apertures. In other examples, the first apertures 34 may be elongated apertures and the second apertures 44 may be fitted apertures and in yet other examples both the first apertures 34 and the second apertures 44 may be elongated apertures.

If only the second apertures 44 are elongated apertures, the relative motion along the second direction between the counterplate 30 and the thrust plate 40 is achieved in that the thrust plate 40 moves along the second direction B, while the counterplate 30 is fixed with respect to the second direction due to the fitted apertures. Similarly, if only the first apertures 34 are elongated apertures, only the counterplate 30 moves.

If both sets of apertures 34, 44 are elongated apertures, the relative motion along the second direction B between the counterplate 30 and the thrust plate 40 is achieved in that both the counterplate 30 and the thrust plate 40 move along the second direction B. However, since there has to be a relative motion between the plates, they cannot move in the same direction by the same amount.

Exemplarily, one plate moves in the second direction B (e.g. downwards) and the other plate moves in the direction opposite the second direction B (e.g. upwards). In this case, in the first configuration a pin 15 may be accommodated in the first end portion of a first aperture 34 and in the second end portion of the corresponding second aperture 44 (or vice versa).

Figure 8:
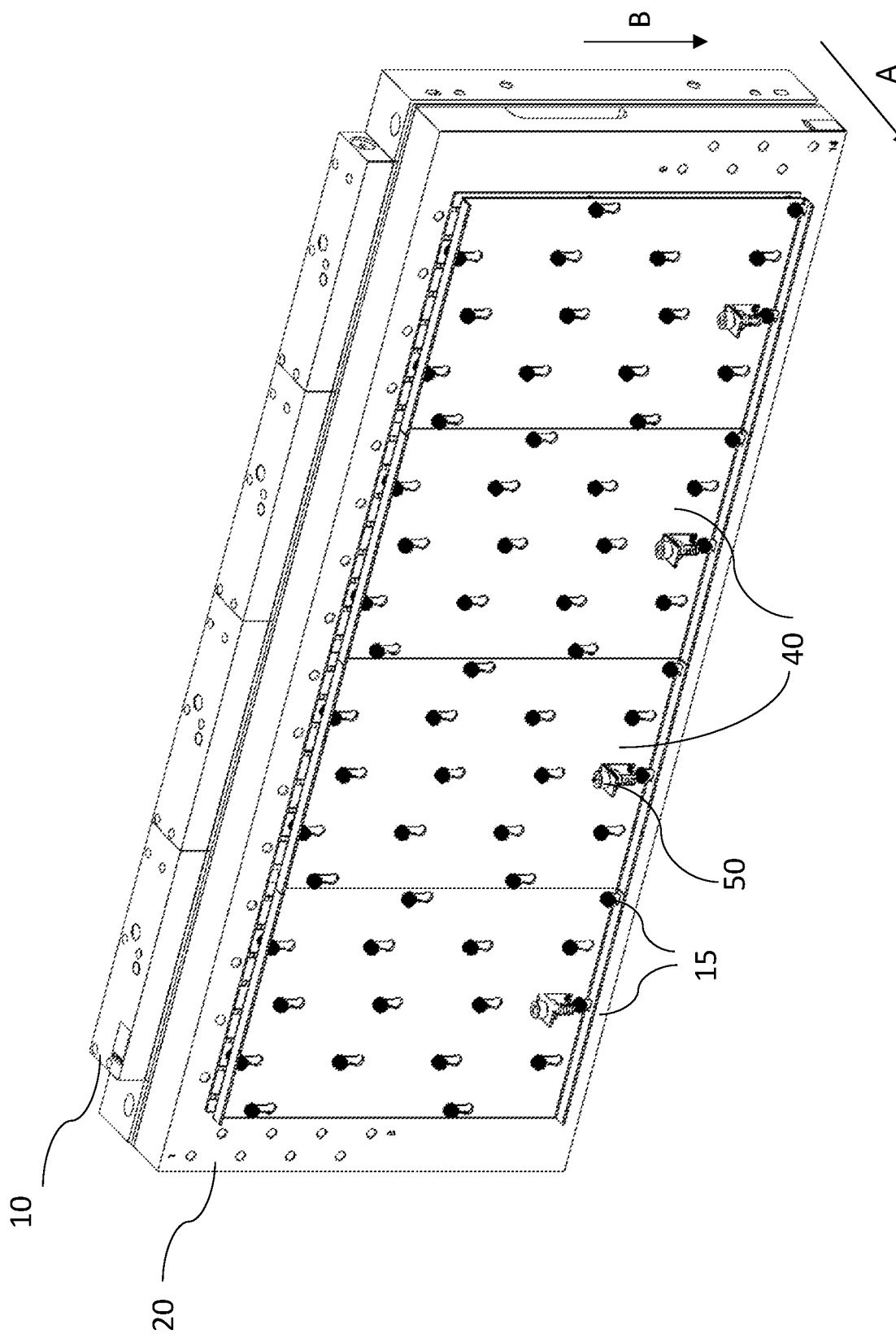
FIG. 8 shows a front view of an exemplary assembly comprising thrust plates, counterplates, a valve cassette block and a valve control block in a second configuration.

A configuration of the assembly in which the fastener-engaging components 36 and 46 are fastened by a fastener and are at a second distance smaller than the first distance, e.g. they are in contact with each other, is denoted as "second configuration". FIG. 8 shows a front view of an exemplary assembly comprising thrust plates 40, counterplates 30, a valve cassette block 20 and a valve control block 10 in a second configuration, with fasteners 50.

As mentioned, in this second configuration, the relative position between each counterplate 30 and respective thrust plate 40 in the second direction has changed with respect to the first configuration. For instance, in the examples of FIGS. 7 and 8, the thrust plates 40 have moved in the second direction B.

Further, as will be explained below, the position of the counterplates 30 and of the valve cassette block 20 relative to the valve control block 10 along the first direction A has also changed. In other words, the transition of the assembly from the first configuration to the second configuration causes a push of the valve cassette block 20 towards the valve control block 10. The pressing of the valve cassette block 20 against the valve control block 10 is brought about by the interaction between the first protrusions 32 and the second protrusions 42, with the thrust plate(s) 40 being fixedly positioned with respect to the first direction A.

Indeed, the plurality of pins 15 and the plurality of second apertures 44 are configured such that the position of the at least one thrust plate 40 with respect to the first direction A is fixed. This holds also when a fastener 50 engages the first and second fastener-engaging components 36, 46 (i.e. in the transition between the first configuration and the second configuration). In other words, the position of the thrust plate 40 with respect to the first direction A is the same in the first configuration and in the second configuration and in the transition between the two configurations.

In particular, the pins 15 and the second apertures 44 may comprise features that anchor the thrust plate 40 at a given position along the pin 15. For instance, each pin 15 may comprise a positioning (fixation) feature, such as a groove or a bulge or lateral slit, configured to interact with a complementary feature in a second aperture 44. The positioning feature and the complementary feature may interlock or fit with each other in a way that blocks the thrust plate 40 with respect to the first direction A while allowing relative gliding movement in the second direction (or a third direction perpendicular to the first and second direction).

Exemplarily, each pin 15 may comprise a groove, e.g. close to its extremity. The position of the groove along the first direction may be determined by the thickness of the valve cassette block 20, the thickness of the counterplate 30, the thickness of the first protrusions 32 and the thickness of the second protrusions 42 (the last two will be further discussed below). In particular, the distance of the groove on the pin 15 from the surface of the valve control block 10 may correspond approximately to the sum of the listed thicknesses. For example, it may be between about 4.4 cm and about 4.6 cm.

The width of the groove may correspond approximately to the thickness of the thrust plate 40. The depth of the groove may be between about 1.8 mm and about 2.0 mm. The groove may continuously extend all around the pin 15 or may be present only in one or more disjoined sections of its outer perimeter. In other words, the groove may be ring-shaped all around the pin or it may just be formed on two opposing sides of the pin lateral to a direction of movement of the thrust plate relative to the pins. In both cases, the cross section of the pin 15 is reduced in correspondence of the groove and this cross section may be referred to as "grooved cross section".

If the thrust plate 40 is configured to move along the second direction B, each second aperture 44 may be an elongated aperture with a varying aperture width. One end portion of the second aperture 44 may substantially correspond to the general cross section of the pin 15, and from this end portion a narrower channel having a width corresponding to the width of the grooved cross section may extend. The second apertures 44 shown in FIG. 6 are an example of elongated aperture with a varying aperture width. Such elongated apertures with a varying aperture width may be the complementary feature to a continuous groove or to a groove comprising two symmetric slits extending in the second direction B.

If the thrust plate 40 is configured not to move along the second direction B (so that the counterplate 30 is configured to move along the second direction), the second apertures 44 are fitted apertures. Fitted apertures may be the complementary feature to a groove comprising a slit e.g. extending in the third direction. Once the pins 15 are inserted in the second apertures 44, the thrust plate 40 is slid within the slits so as to remain fixed. Other types of engagement structures between the pins and the thrust plate may be provided instead of or in addition to the grooves, including a mushroom head-shaped tip of the pin, for example.

As explained above, when a fastener engages the first and second fastener-engaging components 36, 46, the counterplate 30 and the thrust plate 40 move relative to each other along the second direction B, while the thrust plate 40 is locked with respect to the first direction A. Furthermore, the first protrusions 32 and the second protrusions 42 are configured such that the relative motion of the plates along the second direction B is translated into a motion of the valve cassette block 20 in a direction opposite the first direction A.

In the assembled configuration, the first protrusions 32 and the second protrusions 42 face each other. When the counterplate 30 and the thrust plate 40 are moved relative to each other along the second direction, the first protrusions 32 and the second protrusions 42 interact with each other, e.g. come into contact with each other. In particular, the shape, dimensions and location of the protrusions on the respective plate may be such that this interaction creates a force exerting on the valve cassette block 20 in a direction opposite the first direction A.

Exemplarily, at least one plurality between the plurality of first protrusions 32 and the plurality of second protrusions 42 may comprise sloped protrusions. In other words, either the first protrusions 32 may be sloped protrusions or the second protrusions 42 may be sloped protrusions or both sets of protrusions 32, 42 may be sloped protrusions.

A protrusion on a surface, in this case the surface of a plate, has a given height above the surface level (referred to as "protrusion thickness"). A sloped protrusion has a thickness increasing from a first extremity toward a second extremity, i.e. the thickness of the protrusion is smallest at its first extremity and greatest at its second extremity. The thickness may increase monotonically. In other words, at least part of the top surface of the sloped protrusion may be an inclined plane with respect to the plate. The top surface of the sloped protrusion may comprise one or more plateaus, for instance at the two extremities of the sloped protrusion. Exemplarily, a sloped protrusion may be in the shape of a ramp or a wedge. In the example of FIG. 4, the first protrusions 32 are sloped protrusions.

For example, the thickness at the first extremity ("minimum thickness") may be between about 0 mm and about 0.75 mm and the thickness at the second extremity ("maximum thickness") may be between about 3 mm and about 4 mm. The dimension of a sloped protrusion along the third direction (referred to as "the width of the sloped protrusion") may be between about 3 mm and about 4 mm.

As mentioned, at least one plate between the counterplate 30 and the thrust plate 40 may comprise sloped protrusions. The sloped protrusions are arranged on the surface of the plate so that their thickness is along the first direction A and their slope extends along the second direction B. In other words, the protrusion thickness varies in the same direction of the relative motion between the counterplate 30 and the thrust plate 40, which is the same direction of the separation between the fastener-engaging components 36, 46.

The dimension of a sloped protrusion along the second direction B (referred to as "length of the sloped protrusion"), i.e. the distance between the first extremity and the second extremity, may be between about 9 cm and about 11 cm. For example, the length of the sloped protrusion may be substantially the same as the length of an elongated aperture, in the case in which only one of the plates 30, 40 is configured to move along the second direction. In the case in which both plates 30, 40 move, the length of the sloped protrusion may be substantially double the length of an elongated aperture.

The (at least one) set of sloped protrusions may cooperate with the other set of protrusions, which may or may not be sloped protrusions as well, to provide a linear cam mechanism that converts the linear motion of the plate(s) along the second direction in a linear motion of the counterplate 30, and consequently of the valve cassette block 20, in the direction opposite the first direction A. This is made possible by the fixed position of the thrust plate 40.

Accordingly, the other set of protrusions may be referred to as "cam protrusions". A cam protrusion may have a varying thickness or a constant thickness. The part of the cam protrusion with the greatest thickness may be referred to as "abutting part". Exemplarily, the thickness of the abutting part may be equal to the difference between the maximum thickness and the minimum thickness of the sloped protrusion. In other examples, the thickness of the abutting part may be less than or greater than this difference. Generally, thickness of the abutting part may be between about 2.5 mm and about 3 mm.

In the first configuration, the abutting part of a cam protrusion may be positioned such that it abuts against a starting location on the plate comprising the sloped protrusions, wherein the starting location may be determined with respect to the sloped protrusion with which the abutting part is configured to interact. In particular, the starting location may be a location from which a path toward the second extremity of that sloped protrusion comprises at least part of the slope of the sloped protrusion.

Exemplarily, the arrangement of the protrusions on the plates may be such that the starting location may be the first extremity of the corresponding slope protrusion. Accordingly, in this example, in the first configuration the counterplate 30 and the thrust plate 40 may be at a distance substantially corresponding to the largest one between the abutting part thickness plus the minimum thickness and the maximum thickness. In other examples, in the first configuration, the starting location may be prior to the slope or a position on the slope between the first extremity and the second extremity.

The relative motion between the counterplate 30 and the thrust plate 40 may be configured to cause a corresponding relative motion between the abutting part of the cam protrusion and the second extremity of the sloped protrusion. In other words, either the abutting part moves toward the second extremity or the second extremity moves toward the abutting part or they both move towards each other. Given the starting location, the cam protrusion slides (actively or passively) on the slope of the sloped protrusion.

Thus, in the second configuration, the cam protrusion may abut against an ending location that has a greater distance from the surface of the plate comprising the sloped protrusions in comparison to the starting location. In other words, the thickness of the ending location may be greater than the thickness of the starting location, wherein the thickness of the starting location may be zero. Accordingly, a distance between the counterplate 30 and the thrust plate 40 increases when going from the first configuration to the second configuration.

Exemplarily, the abutting part of each cam protrusion may abut against the second extremity of the corresponding slope protrusion. Accordingly, in this example, in the second configuration the counterplate 30 and the thrust plate 40 may be at a distance substantially corresponding to the sum of the maximum thickness and the abutting part thickness.

Since the thrust plate 40 is fixed along the first direction, the increase in the distance between the counterplate 30 and the thrust plate 40 means that the counterplate 30 has moved in the direction opposite the first direction. This movement of the counterplate 30 pushes the valve cassette block 20 towards the valve control block 10 by the same amount.

In one example, the cam protrusions may be sloped protrusions too. In other words, the first protrusions 32 may be sloped protrusions and the second protrusions 42 may be sloped protrusions. For instance, the slopes may have opposite orientations: the sloped protrusions on one plate have a thickness increasing in the second direction B and the sloped protrusions on the other plate have a thickness decreasing in the second direction B. Exemplarily, the sloped protrusions on both plates 30, 40 may have the same dimensions, such as the same thickness and length.

In another example, the cam protrusions may not be sloped protrusions. The cam protrusions may have a substantially constant thickness, e.g. have a rectangular cross section in the plane formed by the first and second directions. Alternatively, the cam protrusions may have a varying (but not sloping) thickness, e.g. have a semicircular cross section in the plane formed by the first and second directions. FIG. 6 shows an example of cam protrusions having a semicircular cross section.

Exemplarily, the dimension of the not-sloped cam protrusions along the second direction (referred to as "length of the cam protrusions") may be such that, depending on the specific shape of the cam protrusion, its abutting part can contact the first extremity of the slope protrusion. For instance, the length of a cam protrusion may be between about 3 mm and about 5 cm.

Independently of whether the cam protrusions are sloped protrusions or not, the dimension of a cam protrusion along the third direction (referred to as "the width of the cam protrusion") may be the same as the width of the sloped protrusion. In other examples they may be different.

From the above description of the assembly, in particular of the functionality of the plates 30, 40, it follows that the features of the counterplate 30 and the thrust plate 40 are correlated to each other, as already mentioned. In particular, the shapes, relative positions and/or dimensions of the elements of the plates, such as the apertures, the protrusions and the fastener-engaging components, may be chosen so as to enable the relative motion along the second direction B between the plates and transform it in a motion along the first direction A.

Further, it follows that the pins 15 are subject to stress when the fastener engages the fastener-engaging components 36, 46. Accordingly, the number of pins may be chosen at least partly based on stress and/or stability considerations. Similarly, the number of protrusions on the plates as well as the number of pairs of plates may be chosen based on thrusting force homogeneity and/or stability considerations. Exemplarily, the density of pins may vary dependent on the specific design requirements of a given application.

Figure 9:
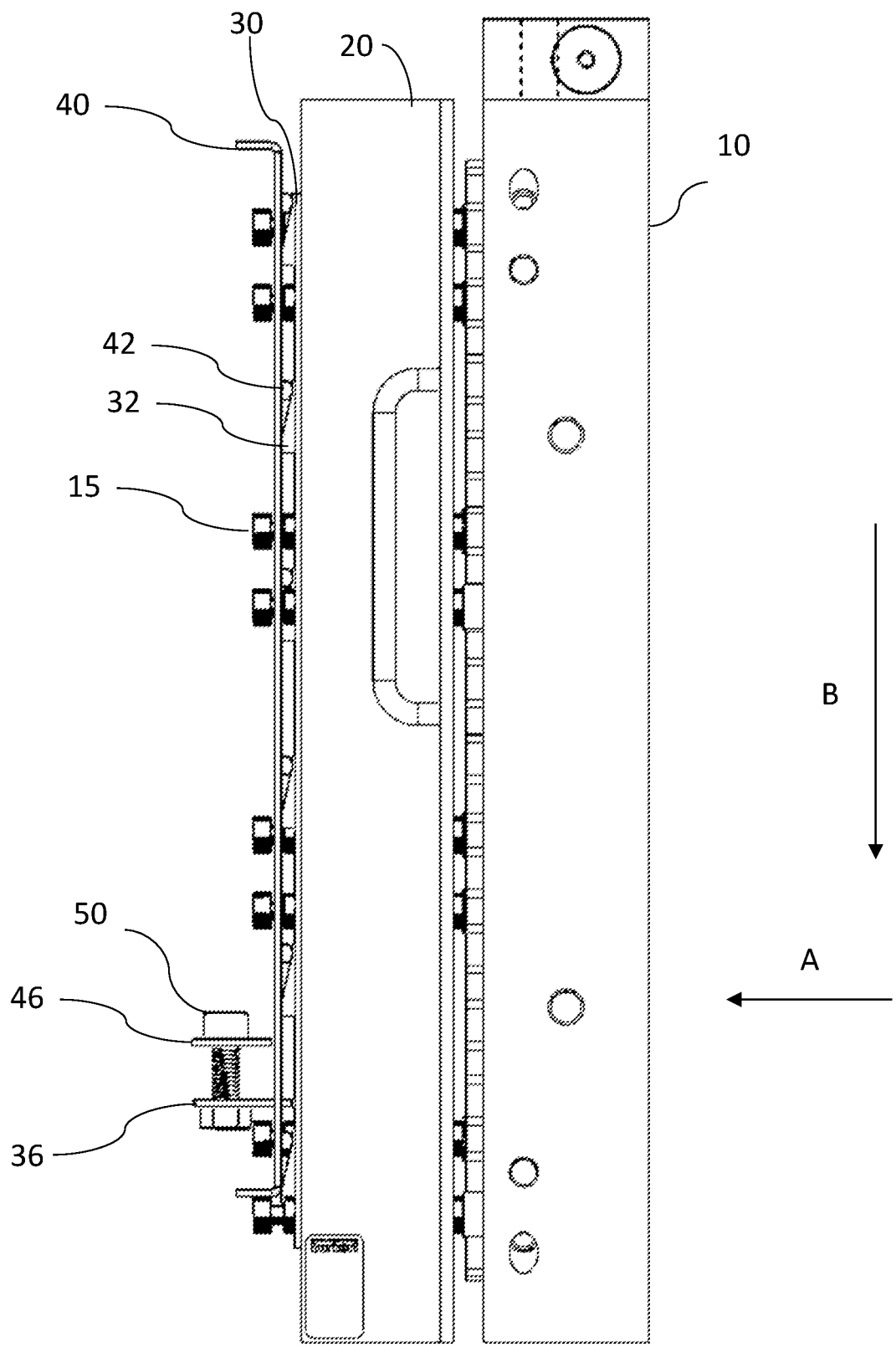
FIG. 9 shows a side view of an exemplary assembly comprising thrust plates, counterplates, a valve cassette block and a valve control block in a first configuration.
Figure 10:
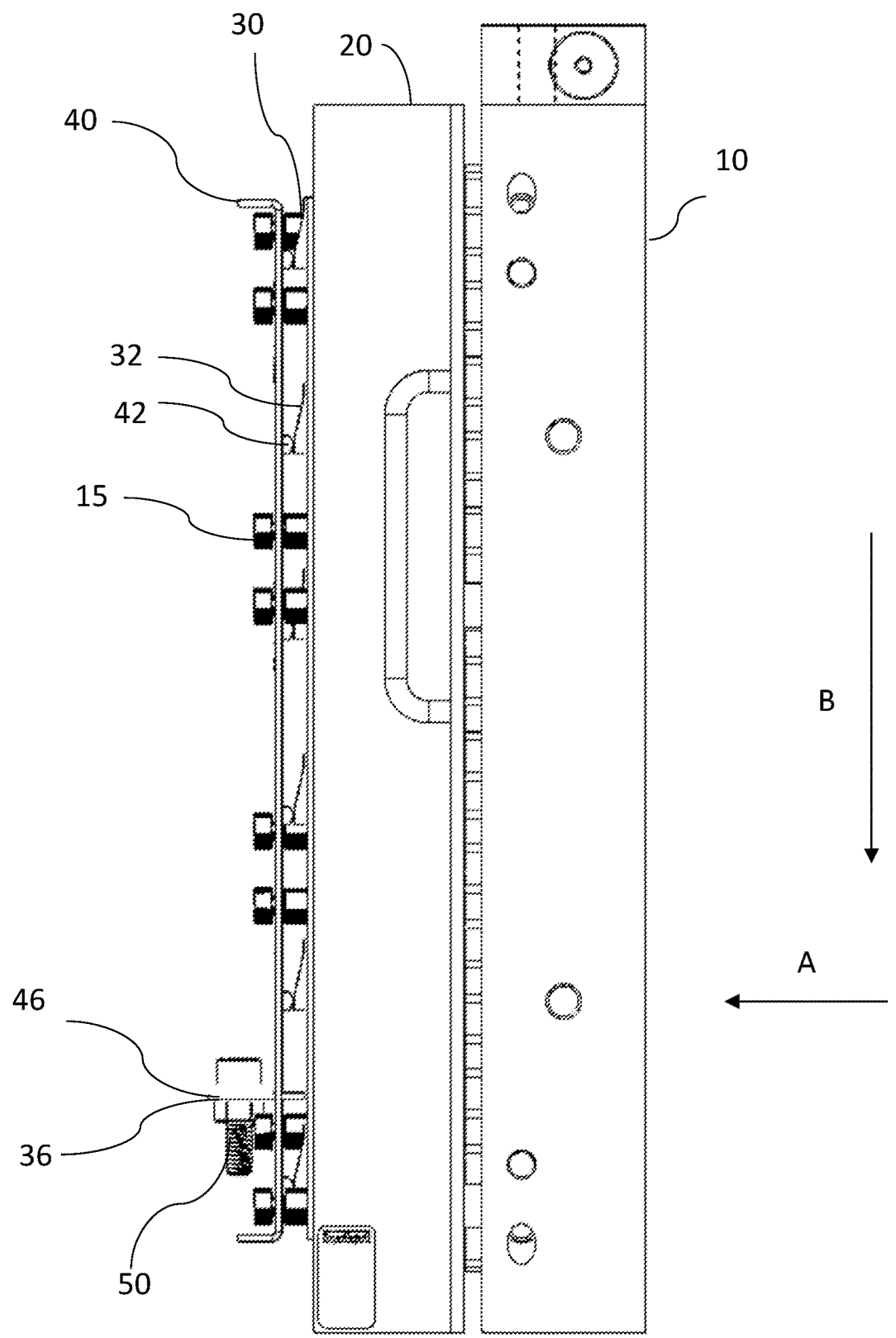
FIG. 10 shows a side view of an exemplary assembly comprising thrust plates, counterplates, a valve cassette block and a valve control block in a second configuration.
Figure 11:
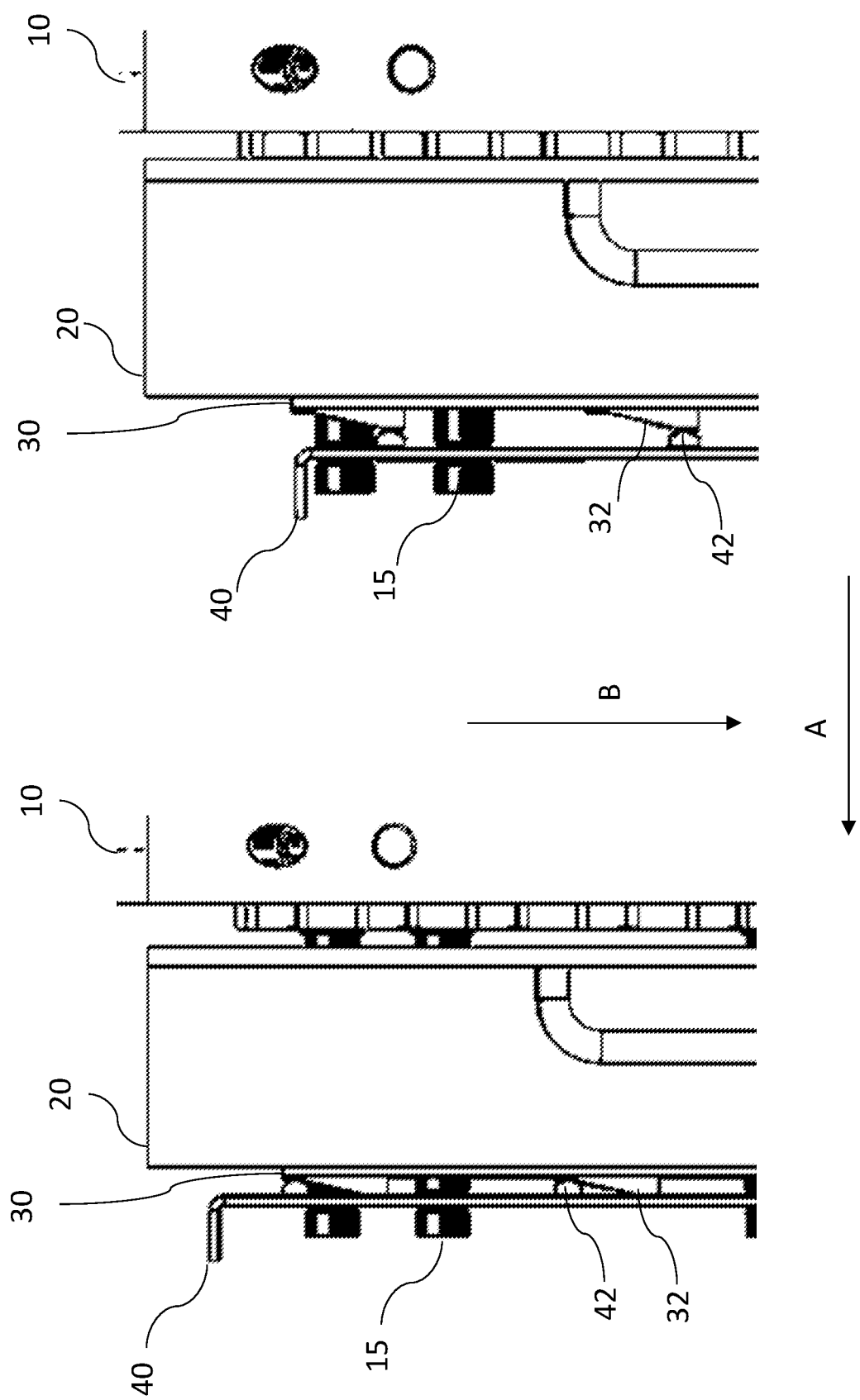
FIG. 11 shows a side-to-side comparison between details of the side views of FIGS. 9 and 10.

FIGS. 9 to 11 show a side view of an exemplary assembly in which the first protrusions 32 are sloped protrusions, the first apertures 34 are fitted apertures (i.e. the counterplate 30 cannot move along the second direction), the second protrusions 42 are not-sloped cam protrusions and the second apertures 44 are elongated apertures (i.e. the thrust plate 40 can move along the second direction). More specifically, FIG. 9 shows the first configuration, FIG. 10 shows the second configuration and FIG. 11 shows a comparison between the two configurations.

In the first configuration, shown in FIG. 9, the valve cassette block 20 is not pressed in an airtight manner against the valve control block 10, as can be seen from the pins 15 visible between the valve cassette block 20 and the valve control block 10. Both fastener-engaging components 36, 46 extend in the first direction, with the first fastener-engaging component 36 passing through a gap in the thrust plate 40. The first fastener-engaging component 36 is separated by a first distance along the second direction from the second fastener-engaging component 46.

In particular, the second fastener-engaging component 46 is located above the first fastener-engaging component 36. Since in this example the counterplate 30 is not configured to move along the second direction, while the thrust plate 40 is, the action of the fastener 50 will push the thrust plate 40 in the second direction (downwards in this example) until the second fastener-engaging component 46 reaches the first fastener-engaging component 36. Accordingly, in the first configuration, each pin 15 is accommodated in the second end portion (lower end portion) of the respective elongated second aperture 44.

Each second aperture 44 has a narrow channel configured to interact with a groove on its respective pin 15. In particular, when the thrust plate 40 moves downwards, the thrust plate 40 is stuck within the grooves of the pins 15 and cannot move along the first direction.

Each cam protrusion 42 abuts against the first extremity of the respective sloped protrusion 32. Each sloped protrusion has a plateau of constant thickness at the two extremities. The thickness of the abutting part of the cam protrusion is substantially the same as the difference between the maximum and minimum thicknesses of the sloped protrusion, so that the counterplate 30 and the thrust plate 40 are separated by the maximum thickness of the sloped protrusions.

In accordance with the configuration of the fastener-engaging components 36, 46 and the second apertures 44, the slope of the first protrusions 32 increases in the second direction. In this way, when the fastener 50 engages the fastener-engaging components 36, 46 and the thrust plate 40 moves in the second direction, the second protrusions 42 will interact with the first protrusions 32, generating the thrusting force.

In the second configuration, shown in FIG. 10, the fastener 50 has completely engaged the fastener-engaging components 36, 46, which are now adjacent to each other. Each second protrusion 42 abuts against the second extremity of the respective sloped protrusion 32, so that the distance between the counterplate 30 and the thrust plate 40 is substantially the sum of the thickness of the abutting part and the maximum thickness of the first protrusions 32. In other words, their distance has increased by the thickness of the abutting part. This is also shown in the enlarged comparison of FIG. 11.

Since the position of the thrust plate 40 along the first direction has not changed in virtue of the fit between the grooves on the pins 15 and the narrow channels of the second apertures 44, the force that has widened the distance between the plates was directed against the first direction A. In other words, the counterplate 30 has been pushed in the direction opposite to the first direction A. Since the counterplate 30 is in direct contact with the valve cassette block 20, the valve cassette block 20 is also pushed as a consequence, and specifically against the valve control block 10. Indeed, as shown in FIG. 10, there is no gap between the valve cassette block 20 and the valve control block 10 any longer.

Accordingly it is possible to adequately press the valve cassette block 20 against the valve control block 10 to provide a functioning valve setup.

The above described method for installing the valve cassette block 20 (i.e. functionally connecting to the valve control block 10) is simple, intuitive and requires minimal effort. In particular, the time for assembly is significantly reduced with respect to a conventional method in which screws are directly used to fix the valve cassette block 20 to the valve control block 10. Also the number of components is significantly reduced, e.g. from 64 screws to 4 screws, as in the example discussed above, and no torque wrench is required. Further, compared with a hydraulic mounting system, the cost and complexity of the method are greatly reduced. Finally, any assembling errors are easy to spot, so operator errors are virtually eliminated.

The invention claimed is:

1. An assembly comprising:
   at least one valve unit comprising a plurality of valves, the at least one valve unit having a plurality of valve unit protrusions extending in a first direction and at least one valve unit fastener-engaging component;
   a valve control block configured to open and close the plurality of valves, the valve control block comprising a plurality of pins extending in the first direction; and
   at least one thrust plate comprising a plurality of thrust plate protrusions, a plurality of thrust plate apertures configured to receive the plurality of pins and at least one thrust plate fastener-engaging component;
   wherein:
   the at least one valve unit further comprises a plurality of fitted through-holes configured to receive the plurality of pins and the at least one valve unit is positioned adjacent to the valve control block in the first direction;
   the at least one thrust plate is positioned adjacent to the at least one valve unit in the first direction such that the plurality of thrust plate protrusions face the plurality of valve unit protrusions;
   the at least one valve unit fastener-engaging component and the at least one thrust plate fastener-engaging component are configured to be separated by an engagement distance along a second direction perpendicular to the first direction and the at least one valve unit fastener-engaging component and the at least one thrust plate fastener-engaging component are configured to be engaged by a fastener to reduce the engagement distance such that the at least one thrust plate and the at least one valve unit at least partially move relative to each other along the second direction;
   the plurality of pins and the plurality of thrust plate apertures are configured such that a position of the at least one thrust plate with respect to the first direction is fixed relative to the plurality of pins; and
   the plurality of valve unit protrusions and the plurality of thrust plate protrusions are configured such that the relative motion along the second direction is translated into a force on the at least one valve unit in a direction opposite the first direction.

2. The assembly of claim 1, wherein the at least one valve unit comprises:
   at least one valve cassette block comprising the plurality of valves and the plurality of fitted through-holes; and
   at least one counterplate comprising the plurality of valve unit protrusions, a plurality of counterplate apertures configured to receive the plurality of pins, and the at least one valve unit fastener-engaging component;
   wherein the at least one counterplate is positioned adjacent to the at least one valve cassette block in the first direction.

3. The assembly of claim 1, wherein at least one plurality of protrusions between the plurality of valve unit protrusions and the plurality of thrust plate protrusions is a plurality of sloped protrusions, wherein each sloped protrusion has a thickness increasing from a first extremity toward a second extremity along the second direction.

4. The assembly of claim 3, wherein:
   other plurality of protrusions is a plurality of cam protrusions;
   each cam protrusion comprises an abutting part, the abutting part being a part of the cam protrusion with a greatest thickness; and
   wherein, when the at least one thrust plate and the at least one valve unit move relative to each other along the second direction:
   each abutting part is configured to change from abutting against a starting location at a respective sloped protrusion to abutting against an ending location at a respective sloped protrusion,
   wherein the ending location has a greater distance from a surface of the at least one thrust plate comprising the plurality of sloped protrusions in comparison to the starting location.

5. The assembly of claim 1, wherein each pin of the plurality of pins comprises a groove.

6. The assembly of claim 1, wherein at least one of a plurality of counterplate apertures and the plurality of thrust plate apertures is a plurality of elongated apertures, wherein each elongated aperture has a dimension along the second direction that is greater than a dimension of a pin of the plurality of pins along the second direction.

7. The assembly of claim 6, wherein the plurality of thrust plate apertures is the plurality of elongated apertures, and wherein each elongated aperture has a varying width, the varying width being a dimension of the elongated aperture along a third direction perpendicular to the first direction and the second direction.

8. The assembly of claim 1, wherein each valve of the plurality of valves is a membrane valve.

9. The assembly of claim 8, wherein the valve control block comprises a plurality of control elements, each control element comprising a solenoid and an air chamber.

* * * * *